(12) United States Patent
Schwartz et al.

(10) Patent No.: US 9,583,019 B1
(45) Date of Patent: Feb. 28, 2017

(54) COCKPIT FLOW TRAINING SYSTEM

(75) Inventors: Samantha Ann Schwartz, Castle Pines, CO (US); Alexander V. Korolev, Aurora, CO (US); Nima Barraci, Frankfurt am Main (DE)

(73) Assignee: THE BOEING COMPANY, Chicago, IL (US)

( * ) Notice: Subject to any disclaimer, the term of this patent is extended or adjusted under 35 U.S.C. 154(b) by 454 days.

(21) Appl. No.: 13/428,105

(22) Filed: Mar. 23, 2012

(51) Int. Cl.
*G09B 9/16* (2006.01)
*G09B 9/20* (2006.01)

(52) U.S. Cl.
CPC ............ *G09B 9/16* (2013.01); *G09B 9/206* (2013.01)

(58) Field of Classification Search
CPC . G09B 9/301; G09B 9/08; G09B 9/28; G09B 9/46; G09B 9/48; G09B 9/50; G09B 9/206
USPC ....... 434/14, 15, 28–59, 220, 241, 243, 372; 472/130; 446/7
See application file for complete search history.

(56) References Cited

U.S. PATENT DOCUMENTS

| | | | | |
|---|---|---|---|---|
| 4,852,031 | A | * | 7/1989 | Brasington .................... 434/45 |
| 5,143,505 | A | * | 9/1992 | Burdea et al. .................. 414/5 |
| 5,319,387 | A | * | 6/1994 | Yoshikawa .................. 345/179 |
| 5,320,538 | A | * | 6/1994 | Baum ...................... 434/307 R |
| 5,322,441 | A | * | 6/1994 | Lewis et al. ............. 434/307 R |
| 5,581,271 | A | * | 12/1996 | Kraemer ......................... 345/8 |
| 5,803,738 | A | * | 9/1998 | Latham .......................... 434/29 |
| 6,012,926 | A | * | 1/2000 | Hodges et al. .............. 434/236 |
| 6,109,920 | A | * | 8/2000 | Shih et al. ..................... 434/37 |
| 6,979,164 | B2 | * | 12/2005 | Kramer ............................ 414/5 |
| 7,111,939 | B2 | * | 9/2006 | Cok et al. ......................... 353/7 |
| 7,585,215 | B1 | * | 9/2009 | Kanno et al. .................... 463/6 |
| 7,871,270 | B2 | * | 1/2011 | Seeliger et al. ................ 434/38 |
| 2002/0113771 | A1 | * | 8/2002 | Rosenberg et al. ........... 345/156 |
| 2003/0054323 | A1 | * | 3/2003 | Skaggs .......................... 434/29 |
| 2008/0014987 | A1 | * | 1/2008 | Kusuda et al. ............ 455/556.1 |
| 2010/0227297 | A1 | * | 9/2010 | Harvey et al. ................. 434/11 |
| 2010/0266993 | A1 | * | 10/2010 | Gregoire et al. .............. 434/45 |
| 2011/0171612 | A1 | * | 7/2011 | Gelinske et al. .............. 434/35 |
| 2011/0183301 | A1 | * | 7/2011 | Turner .......................... 434/43 |
| 2012/0315603 | A1 | * | 12/2012 | Streid ............................ 434/37 |
| 2014/0146394 | A1 | * | 5/2014 | Tout et al. .................... 359/630 |

OTHER PUBLICATIONS

Digital Flight Simulator A-10c warthog https://web.archive.org/web/20110207210354/http://www.digitalcombatsimulator.com/en/series/warthog/.*

(Continued)

*Primary Examiner* — Sam Yao
*Assistant Examiner* — Michael Humphrey
(74) *Attorney, Agent, or Firm* — Yee & Associates, P.C.

(57) ABSTRACT

An aircraft simulation system comprising a user interface and a simulator in communication with the user interface. The user interface is configured to interact with an operator. The simulator is configured to generate a representation of controls in an aircraft that are visible from a current field of view identified by the user interface. The simulator is further configured to display the representation of the controls on the user interface. The simulator is further configured to identify interaction by the operator with the controls from user input received by the user interface. The simulator is further configured to record a sequence of performed operations from the interaction with the controls.

20 Claims, 11 Drawing Sheets

(56) References Cited

OTHER PUBLICATIONS

Digital Flight Simulator Basic Maneuvers https://web.archive.org/web/20110419100149/http://files.digitalcombatsimulator.com/en/40645/.*
Digital Flight Simulator Trust in your Wingman https://www.youtube.com/watch?v=wJ1UWrOfxhs.*
TrackerIR Explained https://www.youtube.com/watch?v=_AO0F5sLdVM.*
Loukopoulos et al., "Concurrent Task Demands in the Cockpit: Challenges and Vulnerabilities in Routine Flight Operations," Proceedings of the 12th International Symposium on Aviation Psychology, Apr. 2003, 6 pages.

* cited by examiner

FIG. 11
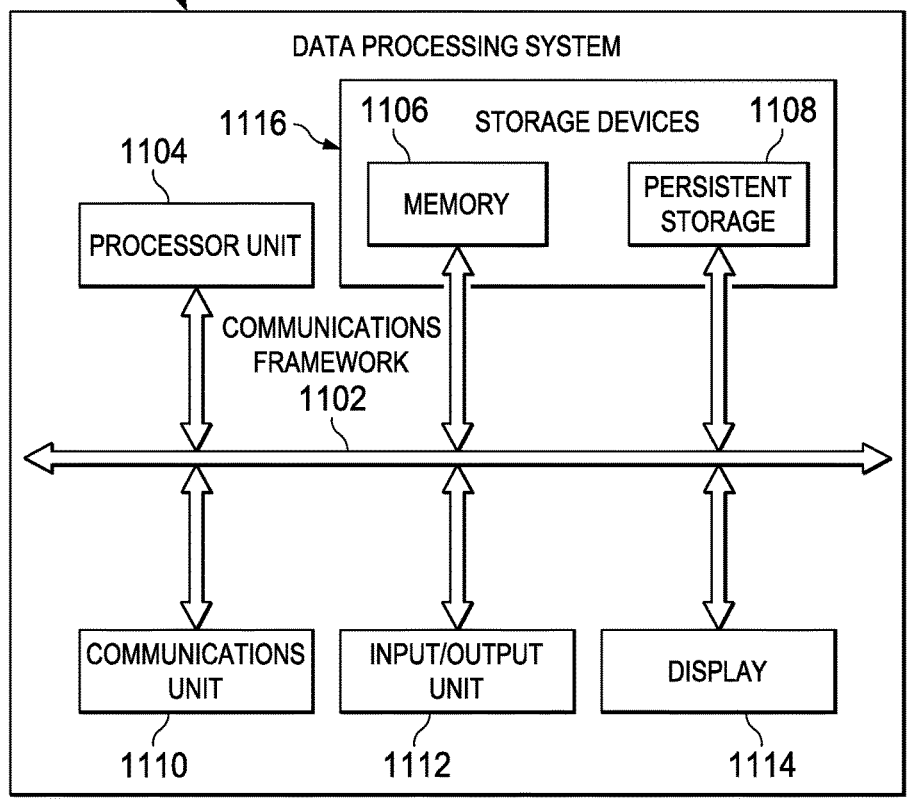
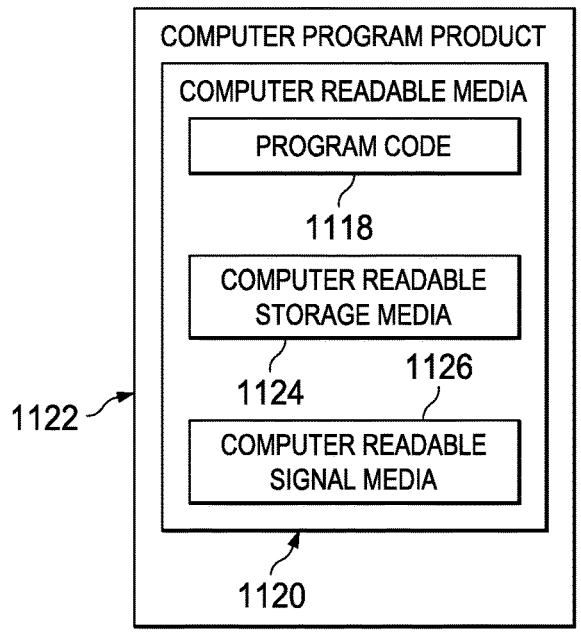

COCKPIT FLOW TRAINING SYSTEM

BACKGROUND INFORMATION

1. Field

The present disclosure relates generally to aircraft and, in particular, to operating aircraft. Still more particularly, the present disclosure relates to a method and apparatus for training operators to perform a sequence of operations for a task for operating an aircraft.

2. Background

In learning to operate an aircraft, pilots go through flight training. Flight training is a course of study that may include various types of training. For example, pilots may attend classroom lessons, use flight simulators, and fly aircraft under the supervision of experienced pilots. Flight training may be performed for new pilots learning to fly an aircraft or for experienced pilots learning to fly a new aircraft.

Part of learning to operate an aircraft includes learning a sequence of operations to perform a task. This sequence of operations may take the form of a flow, a procedure, a memory item, and other types of tasks. Some sequences of operations may be short and straight forward, while other sequences of operations may be longer and more complex.

Currently, pilots learn flows, procedures, memory items, and other tasks using paper materials. For example, a pilot may use a poster of an aircraft in which the poster is a mock-up of controls in the cockpit of the aircraft. The pilot may sit in a chair and visualize manipulating the different controls depicted on the poster to perform flows and procedures.

For example, a pilot may take a sheet of paper with a list of operations for a memory item for an engine fire. This list is used by the pilot with a paper mock-up of aircraft panels to go through the list of operations. This list of operations includes, for example, identifying the affected engine, pulling the thrust lever, moving the start/stop selector to "stop", pulling the fire extinguishing handle, and other operations.

The pilot performs this sequence of operations for the memory item by reading the operations and placing the pilot's hands over the item on the poster. This type of practice, however, does not provide a desired level of interaction with the controls. Oftentimes, a transition from this type of mock-up to a simulator may be difficult.

Although this type of practice may help a pilot remember the sequence of operations to perform for a flow, procedure, or memory item, this type of learning is often more time-consuming than desired. For example, many pilots may learn sequences of procedures faster when actually manipulating controls in the cockpit to perform the sequence of operations for a task. Repetition of this type of movement in a cockpit setting allows for a pilot to eventually perform the sequence of operations more quickly, and/or with less thought or concentration.

In flight training, a full flight simulator may be used to artificially recreate flight in various aspects of the flight environment. This type of flight simulator provides a physical replica of the cockpit with different controls that may be touched and manipulated by the pilot. Manipulation of these controls provides feedback that would occur if the controls were manipulated in the actual aircraft.

Using full flight simulators to learn sequences of operations may be more expensive than desired. As a result of this expense, a pilot may not learn flows and procedures until the first simulator lesson occurs. Therefore, it would be desirable to have a method and apparatus that takes into account at least some of the issues discussed above, as well as other possible issues.

SUMMARY

In one illustrative embodiment, an aircraft simulation system comprises a user interface and a simulator in communication with the user interface. The user interface is configured to interact with an operator. The simulator is configured to generate a representation of controls in an aircraft that are visible from a current field of view identified by the user interface. The simulator is further configured to display the representation of the controls on the user interface. The simulator is further configured to identify interaction by the operator with the controls from user input received by the user interface. The simulator is further configured to record a sequence of performed operations from interaction with the controls.

In another illustrative embodiment, an aircraft simulation system comprises a user input system, a display system, and a simulator. The user input system is configured to identify a current field of view of an operator and identify motion of a hand of the operator. The simulator is in communication with the display system. The simulator is configured to generate a representation of controls in an aircraft that are visible to the operator from the current field of view of the operator. The simulator is further configured to display the representation on the display system. The simulator is further configured to record interaction with the controls.

In yet another illustrative example, a method for simulating interaction with controls in an aircraft is present. The controls are displayed in a user interface for a current field of view of an operator. The interaction with the controls by the operator is identified from user input received by the user interface. A sequence of performed operations for a task to operate the aircraft is recorded from the interaction of the operator with the controls identified from the user input received by the user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a data processing system in accordance with an illustrative embodiment.

DETAILED DESCRIPTION

The illustrative embodiments recognize and take into account a number of different considerations. For example, the illustrative embodiments recognize and take into account that the currently used paper mock-ups of the controls in the cockpit may not provide a desired level of interaction in learning a sequence of operations. The illustrative embodiments recognize and take into account that, in addition to the cost and availability of a full flight simulator, a transition from learning the sequence of operations for a task on a paper mock-up of the controls to the full flight simulator may be more difficult than desired when only using the paper mock-up in training.

The illustrative embodiments recognize and take into account that it would be desirable to have a simulation that provides a greater level of interaction than a paper mock-up. Further, the illustrative embodiments recognize and take into account that it would be desirable to have a simulation system that provides a desired level of interaction such that a pilot is able to transition into performing the sequence of operations in a full flight simulator with less time than is currently necessary.

Thus, the illustrative embodiments provide a method and apparatus for training operators to perform a sequence of operations for a task in an aircraft. In one illustrative embodiment, a simulation system comprises a user interface, a display system, and a simulator. The user interface is configured to identify a current field of view of the operator and a user input by the operator. The simulator is in communication with the user interface and the display system. The simulator is configured to generate a representation of controls in an aircraft that are visible from the current field of view and display the representation on the display system. The simulator is further configured to identify interactions with controls from the user input and to record a sequence of operations performed from interaction with the controls.

Figure 1:
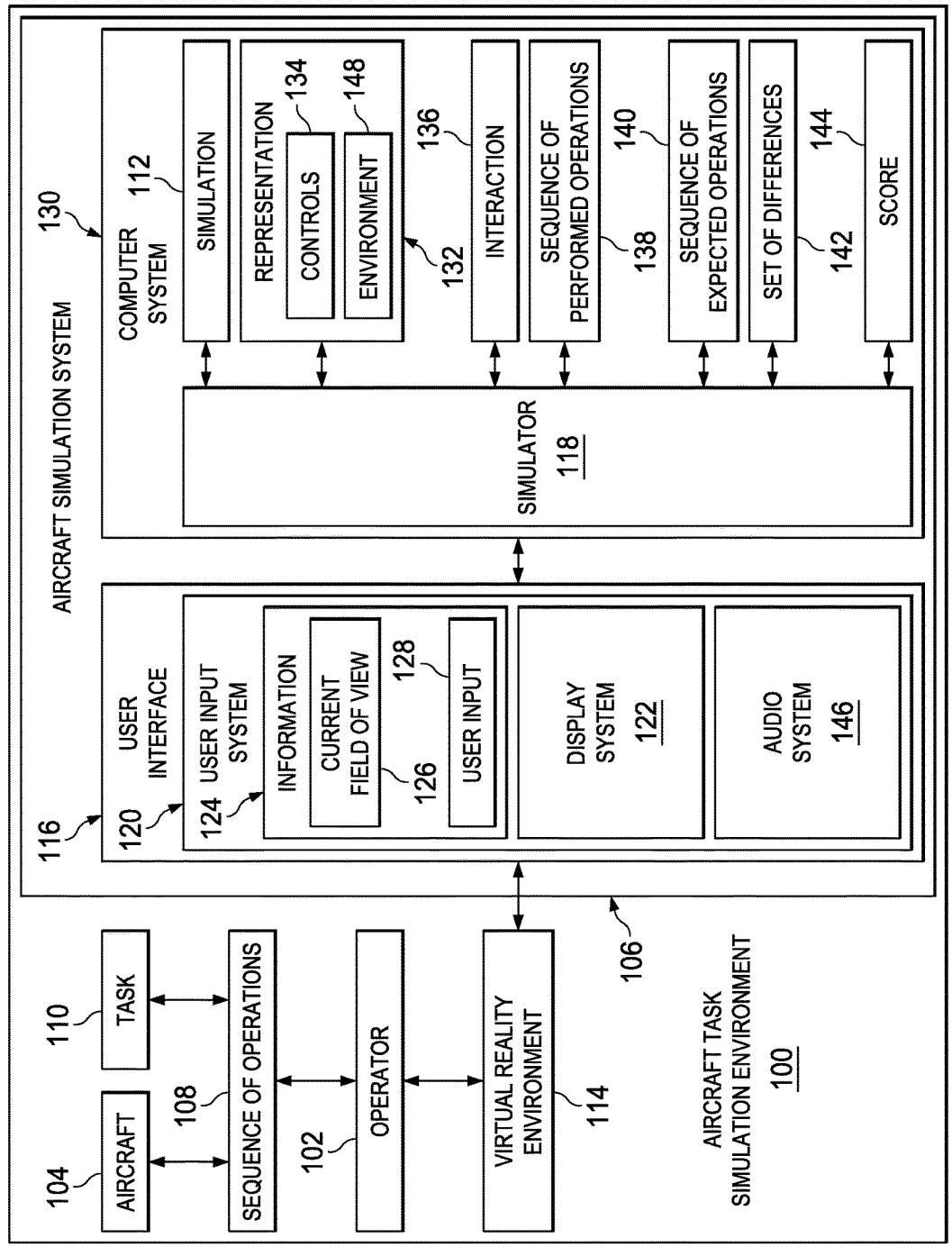
FIG. 1 is an illustration of a block diagram of an aircraft task simulation environment in accordance with an illustrative embodiment.

With reference now to the figures and, in particular, with reference to FIG. 1, an illustration of a block diagram of an aircraft task simulation environment is depicted in accordance with an illustrative embodiment. In this illustrative example, in aircraft task simulation environment 100, operator 102 may train to operate aircraft 104 using aircraft simulation system 106.

In particular, operator 102 may perform sequence of operations 108 for task 110. Operator 102 may perform sequence of operations 108 for task 110 using aircraft simulation system 106 to learn sequence of operations 108 for task 110 for operating aircraft 104. In these illustrative examples, task 110 may take various forms. For example, task 110 may be a flow, a procedure, a memory item, or some other suitable task for operating aircraft 104.

In this illustrative example, aircraft simulation system 106 runs simulation 112 in a manner that provides virtual reality environment 114 for operator 102. In other words, a physical replica of a cockpit or flight deck used in a full flight simulator is unnecessary.

In these illustrative examples, aircraft simulation system 106 comprises user interface 116 and simulator 118. In these illustrative examples, user interface 116 may be implemented using hardware, software, or a combination of the two. User interface 116 is configured to allow operator 102 to interact with simulation 112. In other words, operator 102 is able to interact with various objects within virtual reality environment 114 provided through simulation 112. For example, operator 102 may virtually touch and manipulate objects in virtual reality environment 114.

In one illustrative example, user interface 116 includes user input system 120 and display system 122. User input system 120 is configured to generate information 124 about operator 102.

For example, user input system 120 may be configured to identify current field of view 126 of operator 102 in information 124. Current field of view 126 of operator 102 is the view that operator 102 sees from the current position of the head and/or eyes of the operator.

Additionally, user input system 120 also may be configured to receive user input 128 generated by operator 102 interacting with simulation 112. For example, user input system 120 may include a motion detector, a camera, a motion data capture glove, a touch screen, or other suitable user input devices.

In these illustrative examples, display system 122 is configured to display current field of view 126 to operator 102. Display system 122 may include, for example, stereoscopic glasses, a head worn display system, a liquid crystal display monitor, or other suitable display devices. User input system 120 and display system 122 may be separate devices or may be combined into a single device depending on the particular implementation.

In these illustrative examples, simulator 118 may be implemented using hardware, software, or a combination of the two. Simulator 118 may be, for example, implemented in computer system 130.

Computer system 130 is a number of computers. As used herein, a "number of", when used with reference to items, means one or more items. For example, "number of computers" is one or more computers. When more than one computer is present, those computers may be in communication with each other using a medium such as a network.

In these illustrative examples, computer system 130 may take various forms. For example, without limitation, computer system 130 may be at least one of a workstation, a mobile computer, a tablet computer, a mobile phone, and other suitable types of computing devices that have processor units.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

When simulator 118 runs simulation 112, simulator 118 is configured to generate representation 132 of controls 134 in aircraft 104 that are visible in current field of view 126 of operator 102. Simulator 118 also may be configured to display representation 132 of display system 122.

For example, controls 134 in current field of view 126 may be manipulated through interaction 136 of operator 102 with virtual reality environment 114. Simulator 118 identifies interaction 136 by operator 102 with controls 134 from user input 128.

From interaction 136 with controls 134 by operator 102, simulator 118 records sequence of performed operations 138. More specifically, simulator 118 identifies operations that are performed in sequence of performed operations 138 based on controls 134 that have been manipulated by operator 102 in simulation 112.

Sequence of performed operations 138 recorded by simulator 118 may be stored for later review or may be temporarily stored. When sequence of performed operations 138 is temporarily stored, sequence of performed operations 138 may be deleted after simulation 112 is completed, in response to user input 128 from operator 102, or through some other event.

Further, simulator 118 may compare sequence of performed operations 138 with sequence of expected operations 140. In these illustrative examples, sequence of expected operations 140 is sequence of operations 108 for task 110. The comparison results in set of differences 142. As used herein, a "set" when used with reference to items, means zero or more items. In some cases, set of differences 142 may be an empty set.

With set of differences 142, simulator 118 may generate score 144. Score 144 provides operator 102 an indication of how well operator 102 performed sequence of operations 108 for task 110.

In this manner, operator 102 may perform training for sequence of operations 108 to perform task 110 for aircraft 104 in a manner that is more realistic than using paper mock-ups. With virtual reality environment 114, operator 102 may actually view and interact with objects, such as controls 134, in aircraft 104 without requiring a physical representation of those controls in a full flight simulator.

With aircraft simulation system 106, a transition from learning sequences of operations on paper to performing the sequences of operations in a full flight simulator may be easier. As a result, the time needed in a full flight simulator to learn to fly an aircraft may be reduced. With aircraft simulation system 106, operator 102 may focus more on other activities. Further, the use of aircraft simulation system 106 also may reduce the cost of training operator 102 by reducing the time needed in a full flight simulator.

The illustration of aircraft task simulation environment 100 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative embodiments, user interface 116 may include other components in addition to, or in place of, the ones depicted. For example, audio system 146 also may be part of user interface 116. Audio system 146 may provide sounds, instructions, feedback, and other information to operator 102. These sounds, instructions, and feedback may occur as operator 102 is performing sequence of operations 108 or after score 144 is generated for operator 102 upon completion of sequence of operations 108.

In another example, simulator 118 also may include environment 148 in representation 132 for simulation 112. Environment 148 is the environment around aircraft 104 that operator 102 may see in current field of view 126. For example, environment 148 may include a representation of the sky, an airport, or other suitable images that can be seen from the cockpit or flight deck of aircraft 104 during performance of a type of task 110.

In yet another illustrative embodiment, aircraft simulation system 106 may be implemented for other purposes other than training operator 102 to perform sequence of operations 108 for task 110. For example, aircraft simulation system 106 may be used to test the ability of operator 102 to perform sequence of operations 108 for task 110 as accurately as desired. As another example, aircraft simulation system 106 may be used to test the ability of operator 102 to perform sequence of operations 108 for task 110 as quickly as desired.

Figure 2:
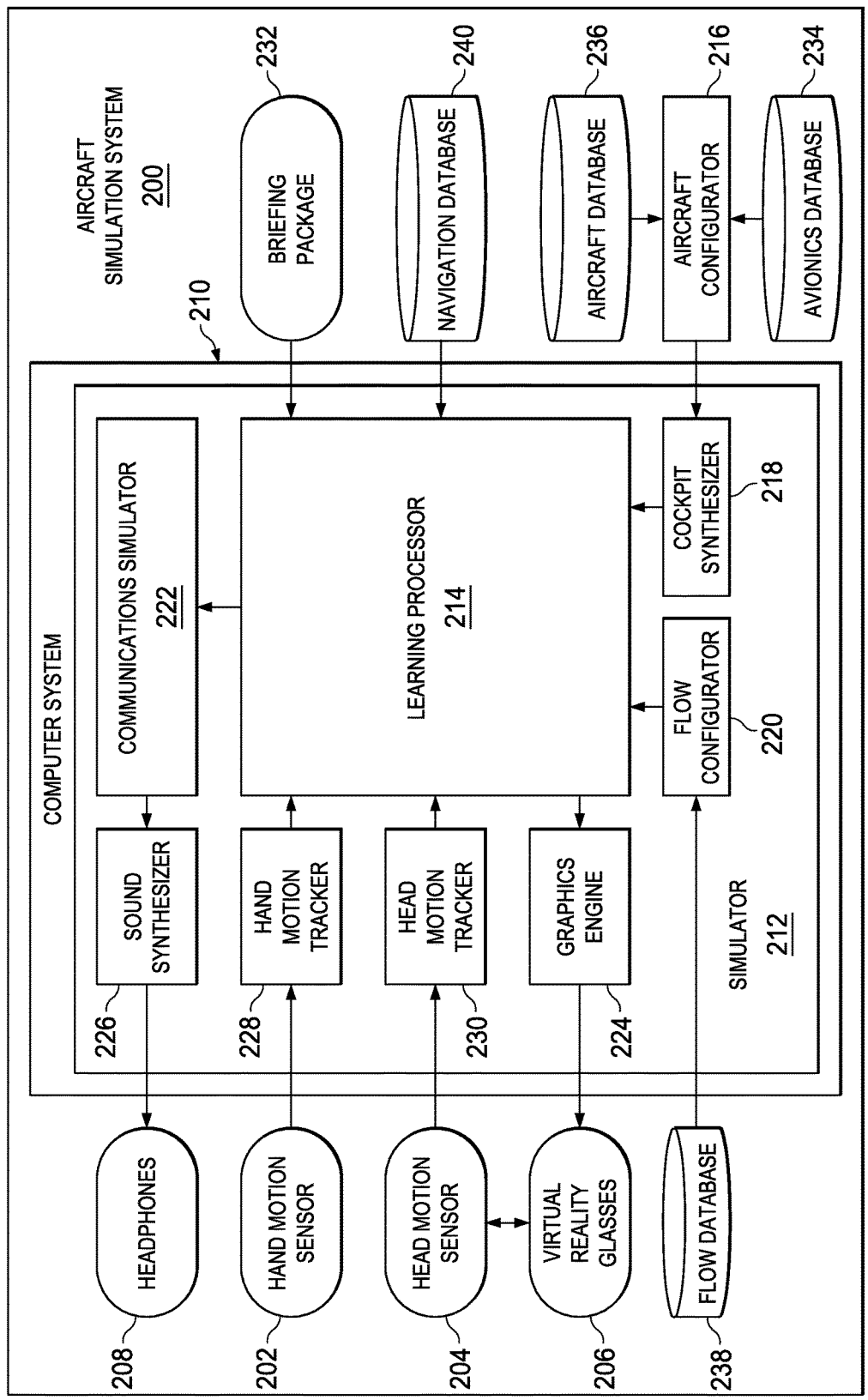
FIG. 2 is an illustration of a block diagram of an aircraft simulation system in accordance with an illustrative embodiment.

With reference now to FIG. 2, an illustration of a block diagram of an aircraft simulation system is depicted in accordance with an illustrative embodiment. In this illustrative example, aircraft simulation system 200 is an example of one implementation for aircraft simulation system 106 in FIG. 1.

Aircraft simulation system 200 includes a number of components. As depicted, hand motion sensor 202, head motion sensor 204, virtual reality glasses 206, headphones 208, and computer system 210 are examples of components in aircraft simulation system 200. These different components in aircraft simulation system 200 are configured to provide a virtual three-dimensional cockpit or flight deck to an operator.

Aircraft simulation system 200 is configurable to provide simulations for different types of aircraft. For example, aircraft simulation system 200 may be configured to provide a simulation of a commercial aircraft, an aircraft with a propeller, a military aircraft, a helicopter, and other suitable types of aircraft.

In this illustrative example, hand motion sensor 202, head motion sensor 204, virtual reality glasses 206, and headphones 208 are examples of components for a user interface, such as user interface 116 in FIG. 1. Hand motion sensor 202 and head motion sensor 204 are examples of devices for a user input system, such as user input system 120 in FIG. 1. Virtual reality glasses 206 are an example of an implementation for a display system, such as display system 122 in FIG. 1. Headphones 208 are an example of an implementation for an audio system, such as audio system 146 in FIG. 1.

As depicted, head motion sensor 204 is associated with virtual reality glasses 206. In other words, head motion sensor 204 may be constructed as part of virtual reality glasses 206. Head motion sensor 204 is configured to generate information about a current field of view of an operator wearing virtual reality glasses 206.

Hand motion sensor 202 is configured to identify motion of the hand of operator 102. Hand motion sensor 202 may be, for example, without limitation, a video camera, a motion data capture glove, and other suitable devices. Hand motion sensor 202 allows an operator to virtually interact with objects in a virtual reality environment generated in a simulation.

In these illustrative examples, simulator 212 includes components such as learning processor 214, aircraft configurator 216, cockpit synthesizer 218, flow configurator 220, communications simulator 222, graphics engine 224, sound synthesizer 226, hand motion tracker 228, and head motion tracker 230. These components may be implemented in hardware, software, or a combination of the two.

Learning processor 214 controls the simulation generated by aircraft simulation system 200. In these illustrative examples, learning processor 214 receives briefing package 232.

In these illustrative examples, briefing package 232 identifies one or more sequences of operations that are to be performed in the simulation. In these illustrative examples, the sequences of operations are for tasks in the form of flows. Of course, the sequences of operations may be for tasks in other forms such as procedures, memory items, and other suitable tasks. Briefing package 232 also includes an identification of the aircraft for which training is to be performed in this illustrative example.

Briefing package 232 also may include a flight plan. The flight plan may provide a scenario in which the sequence of operations for the flows is to be performed.

In these illustrative examples, learning processor 214 uses aircraft configurator 216 and cockpit synthesizer 218 to generate a simulation of the cockpit for the selected aircraft as identified in briefing package 232. More specifically, learning processor 214 may use aircraft configurator 216 and cockpit synthesizer 218 to generate representation of controls that can be seen by an operator in the current field of view of the operator.

As depicted, aircraft configurator 216 accesses avionics database 234 and aircraft database 236. Aircraft configurator 216 generates a configuration of the aircraft identified in briefing package 232 using avionics database 234 and aircraft database 236.

Avionics database 234 includes information about the operation of controls, displays, and other systems in the aircraft. For example, without limitation, avionics database 234 may include information about what functions different controls perform, what information is displayed by display devices in the cockpit, and other suitable information about the operation of different electronic systems in the aircraft.

Aircraft database 236 includes information used to generate a look and feel for the cockpit in the aircraft. For example, without limitation, aircraft database 236 may include information about the dimensions of the cockpit, dimensions of the windshield, an identification of controls, a positioning of controls, a location of seats, and other components in the cockpit.

Cockpit synthesizer 218 generates a representation of the cockpit from the configuration generated by aircraft configurator 216. This representation is a virtual representation for a virtual reality environment in the simulation.

The virtual representation includes the position of controls within the cockpit. The virtual representation provides a view based on the location of the operator and the current field of view of the operator in the cockpit. In these illustrative examples, the location of the operator is a location in the virtual representation of the cockpit. In this manner, learning processor 214 may use cockpit synthesizer 218 to generate a representation of the controls that are visible in the current field of view of the operator.

Simulator 212 may use flow configurator 220 to identify a sequence of operations to be performed by the operator. Flow configurator 220 identifies a sequence of operations to be performed for a task for the particular aircraft identified in briefing package 232 using flow database 238. This sequence of operations may be a sequence of expected operations for the operator.

Flow database 238 is a database containing sequences of operations for different tasks in different aircraft. The same task may have different sequences of operations in different aircraft. Flow database 238 is used by flow configurator 220 to identify the sequence of operations for the aircraft on which training is to be performed.

Further, learning processor 214 also may access navigation database 240 to obtain information about the environment around the aircraft in different locations. This information may be used to provide additional information to increase the reality of the simulation. For example, the information in navigation database 240 may be used to include views seen by the operator in the current field of view through the windshield of the cockpit at different points of the flight simulated using the flight plan in briefing package 232.

Graphics engine 224 is a three-dimensional graphics engine in these illustrative examples. Graphics engine 224 receives a representation generated by learning processor 214. This information is used by graphics engine 224 to generate the display of the representation on virtual reality glasses 206.

As depicted, communications simulator 222 is configured to generate voice communications that may occur during the simulation. The voice communications may be generated by communications simulator 222 from different sources. Sound synthesizer 226 is configured to generate the sound for the voice communications created by communications simulator 222. For example, communications simulator 222 may provide data for voice communications that are to be converted into sounds by sound synthesizer 226. The data may be, for example, text that is translated into sound by sound synthesizer 226. The data may be actual waveforms that are to be output by sounds synthesizer 226.

In one illustrative example, communications simulator 222 may generate data simulating audio that may be generated by the avionics or other equipment in the cockpit. The data may be converted into audio voice communications such as "pull-up" or "V1" by sound synthesizer 226.

Further, radio voice communications may be generated using and presented using communications simulator 222 and sound synthesizer 226. For example, radio voice communications may be defined for the scenario in which training occurs or from an instructor, if one is present. The radio voice communications may be received by communications simulator 222 from sources, such as learning processor 214, which may receive the radio communications data from flow configurator 220.

Hand motion tracker 228 is configured to receive input from hand motion sensor 202. This input from hand motion sensor 202 may be used by hand motion tracker 228 to generate information used to identify an interaction with controls by the operator. For example, based on the input from hand motion sensor 202, hand motion tracker 228 identifies a position of the hand of the operator in the cockpit. This position may be in a coordinate system used to generate the configuration of the cockpit. In this manner, learning processor 214 may be able to identify interaction by the operator with different controls in the cockpit.

For example, hand motion tracker 228 may identify a movement of the hand of the operator through a number of positions. These positions may correspond to a particular control and the movement of the hand through the number of positions may indicate a manipulation of the control. This manipulation may be, for example, without limitation, turning a dial, pressing a button, changing a position of a switch, and other types of manipulations of controls in the cockpit.

Further, the position of the hand of the operator also may be included in the representation generated by learning processor 214. In other words, the operator may see the hand of the operator reaching for and touching controls in the representation of the controls in the cockpit.

Head motion tracker 230 is configured to receive input from head motion sensor 204. Head motion tracker 230 identifies a position of the head of the operator. This position includes the location within the cockpit and an orientation of the head of the operator. With this information, head motion tracker 230 identifies a current field of view for the operator. With this current field of view, learning processor 214 changes and/or updates the representation to correspond to the current field of view as the head of the operator moves.

Based on the interaction of the operator with the controls, learning processor 214 may identify a sequence of performed operations. The sequence of performed operations may be compared to a sequence of expected operations. The comparison may be used to identify what operations were performed correctly or incorrectly by the operator. The identification may be scored. The identification scored may then be presented to the operator. In this manner, aircraft simulation system 200 provides a virtual reality environment for the operator to perform a sequence of operations.

The illustration of aircraft simulation system 200 in FIG. 2 is not meant to limit the manner in which different illustrative embodiments may be implemented. For example, aircraft simulation system 200 may be implemented using a tablet or a mobile phone. The positioning of the tablet may be identified as being the current field of view of the operator. The operator may hold the tablet in front of the face of the operator and move the tablet to different positions. Based on movement detected by the tablet, the representation of the cockpit may be updated in the display of the tablet to display controls in the current field of view of the operator.

With the tablet, the interaction of the operator with controls may be identified from a touch screen. For example, a finger of the operator touching a graphical representation of a control may be used to identify a control that has been manipulated for an operation in a sequence of operations.

As another example, although tasks in the form of flows have been illustrated for simulation by simulator 212, other types of tasks also may be implemented in addition to, or in place of, flows. For example, other sequences of operations for tasks such as procedures, memory items, and other suitable tasks also may be implemented in simulator 212.

Figure 3:
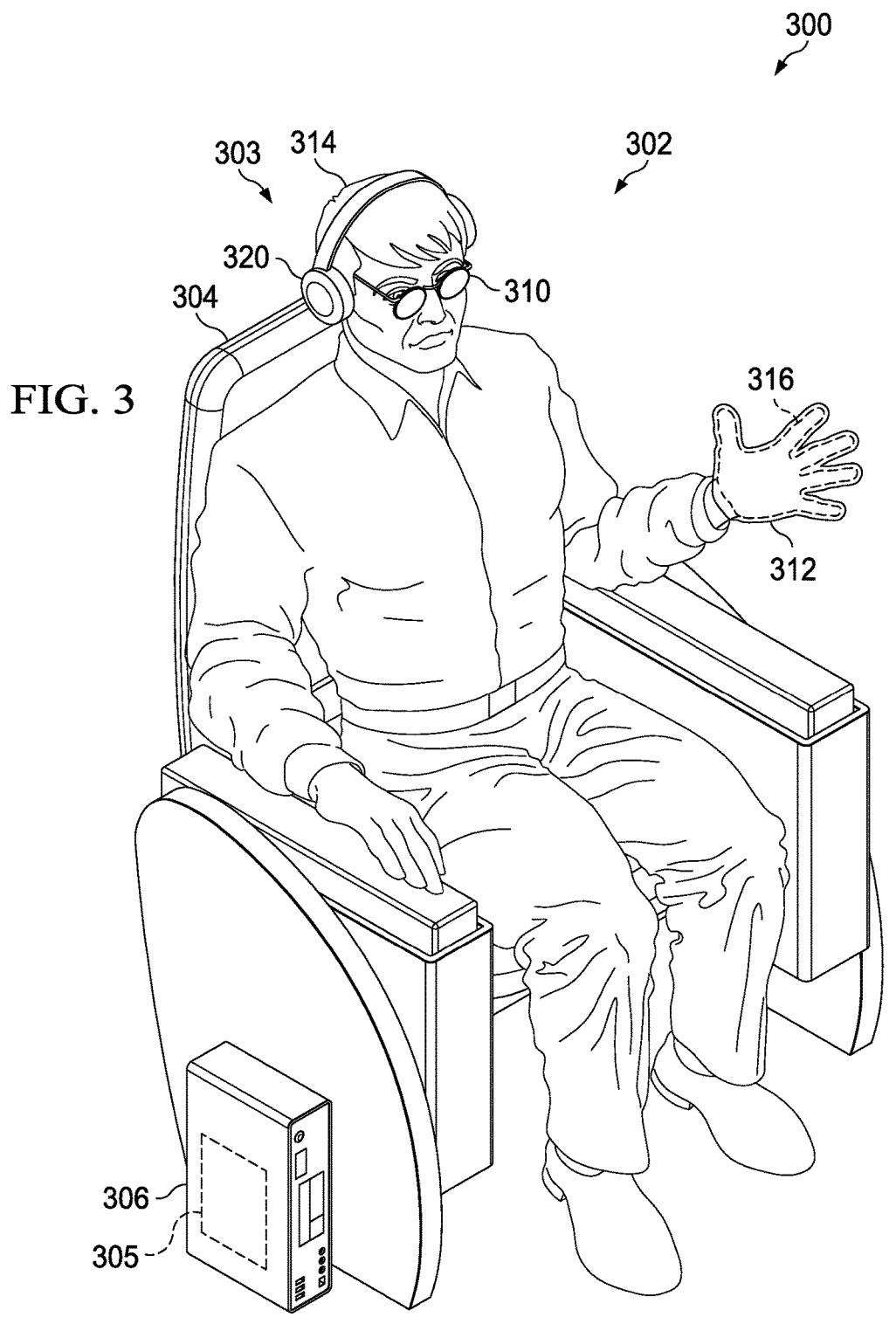
FIG. 3 is an illustration of an aircraft task simulation environment in accordance with an illustrative embodiment.

With reference now to FIG. 3, an illustration of an aircraft task simulation environment is depicted in accordance with an illustrative embodiment. Aircraft task simulation environment 300 is an example of an implementation of aircraft task simulation environment 100 in FIG. 1. In particular, an example of an implementation of aircraft simulation system 106 shown in block form in FIG. 1 is depicted in this figure. More specifically, aircraft simulation system 302 is an example of aircraft simulation system 200 in FIG. 2.

In this illustrative example, operator 303 sits in chair 304 to perform a simulation in which operator 303 interacts with controls for an aircraft in a virtual reality environment provided by a simulation run on simulator 305.

In this illustrative example, simulator 305 is implemented using computer 306. As depicted, operator 303 wears virtual reality glasses 310 and motion data capture glove 312. Virtual reality glasses 310 also include a motion sensor to identify the position of head 314 of operator 303.

Motion data capture glove 312 is a glove that includes sensors and is configured to generate position information for hand 316 of operator 303. The information for the position of hand 316 may also include the position of fingers of hand 316.

Virtual reality glasses 310 display what operator 303 sees in the cockpit of an aircraft based on the current field of view of operator 303. As operator 303 changes the position of head 314, the view displayed by virtual reality glasses 310 changes as the current field of view changes. As operator 303 moves motion data capture glove 312, operator 303 may interact with various controls in the simulation. Further, operator 303 also may see hand 316 through virtual reality glasses 310 when hand 316 with motion data capture glove 312 is within the current field of view of head 314 of operator 303.

In this manner, aircraft simulation system 302 provides a virtual reality environment in which operator 303 can see interaction by operator 303 with controls in a representation displayed on virtual reality glasses 310. Further, operator 303 also wears headphones 320 on head 314. With headphones 320, operator 303 is able to hear voice communications as part of the simulation for performing sequences of operations.

Figure 4:
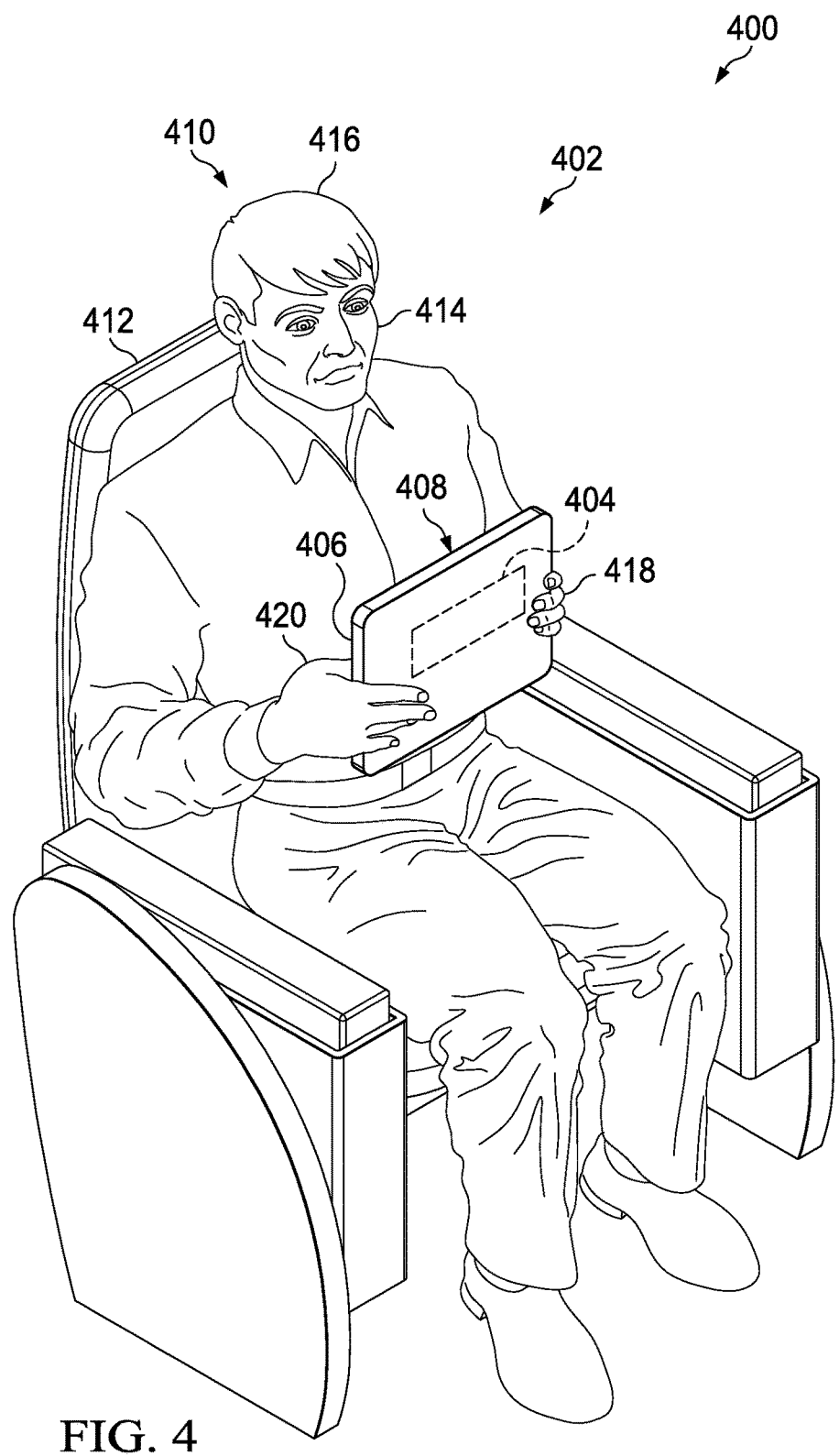
FIG. 4 is an illustration of another aircraft task simulation environment in accordance with an illustrative embodiment.

Turning now to FIG. 4, an illustration of another aircraft task simulation environment is depicted in accordance with an illustrative embodiment. In this depicted example, aircraft task simulation environment 400 is another example of an implementation for aircraft task simulation environment 100 shown in block form in FIG. 1.

As depicted, aircraft simulation system 402 is an example of another implementation for aircraft simulation system 106 in FIG. 1. Aircraft simulation system 402 includes simulator 404 and user interface 406 embodied within tablet computer 408. In this illustrative example, user interface 406 includes a touch screen, a motion sensor, and a video camera in tablet computer 408.

As depicted, operator 410 sits in chair 412 to perform the simulation. In this illustrative example, operator 410 holds tablet computer 408 in front of face 414 of operator 410.

In this depicted example, operator 410 keeps or maintains tablet computer 408 in front of face 414 as operator 410 moves head 416 of operator 410 in different positions. In this manner, simulator 404 identifies changes in the current field of view of operator 410 and displays the controls in the current field of view on tablet computer 408 as if operator 410 was looking at those controls within the cockpit of the aircraft.

In these illustrative examples, operator 410 interacts with those controls using hand 418 or hand 420. Operator 410 may touch and manipulate controls through the touch screen in user interface 406 on tablet computer 408. For example, operator 410 may touch controls displayed on tablet computer 408 to interact with those controls.

The illustration of aircraft simulation system 302 in FIG. 3 and aircraft simulation system 402 in FIG. 4 are not meant to imply limitations to the manner in which different aircraft simulation systems may be implemented. For example, other components in addition to, or in place of, the ones illustrated in FIGS. 3 and 4 may be used. Further, other types of aircraft simulation systems also may be employed in accordance with an illustrative embodiment to embody aircraft simulation system 302 in FIG. 3.

For example, operator 303 in FIG. 3 may employ an additional motion data capture glove in addition to motion data capture glove 312. In still other illustrative examples, the simulator and user interface may be embodied in a mobile phone or other form.

The illustration of the aircraft simulation systems in the aircraft task simulation environments in FIGS. 3 and 4 may be combined with components used in FIGS. 1 and 2, used with components in FIGS. 1 and 2, or a combination of the two. Additionally, some of the components in FIGS. 3 and 4 may be illustrative examples of how components shown in block form in FIGS. 1 and 2 may be implemented as physical structures.

Figure 5:
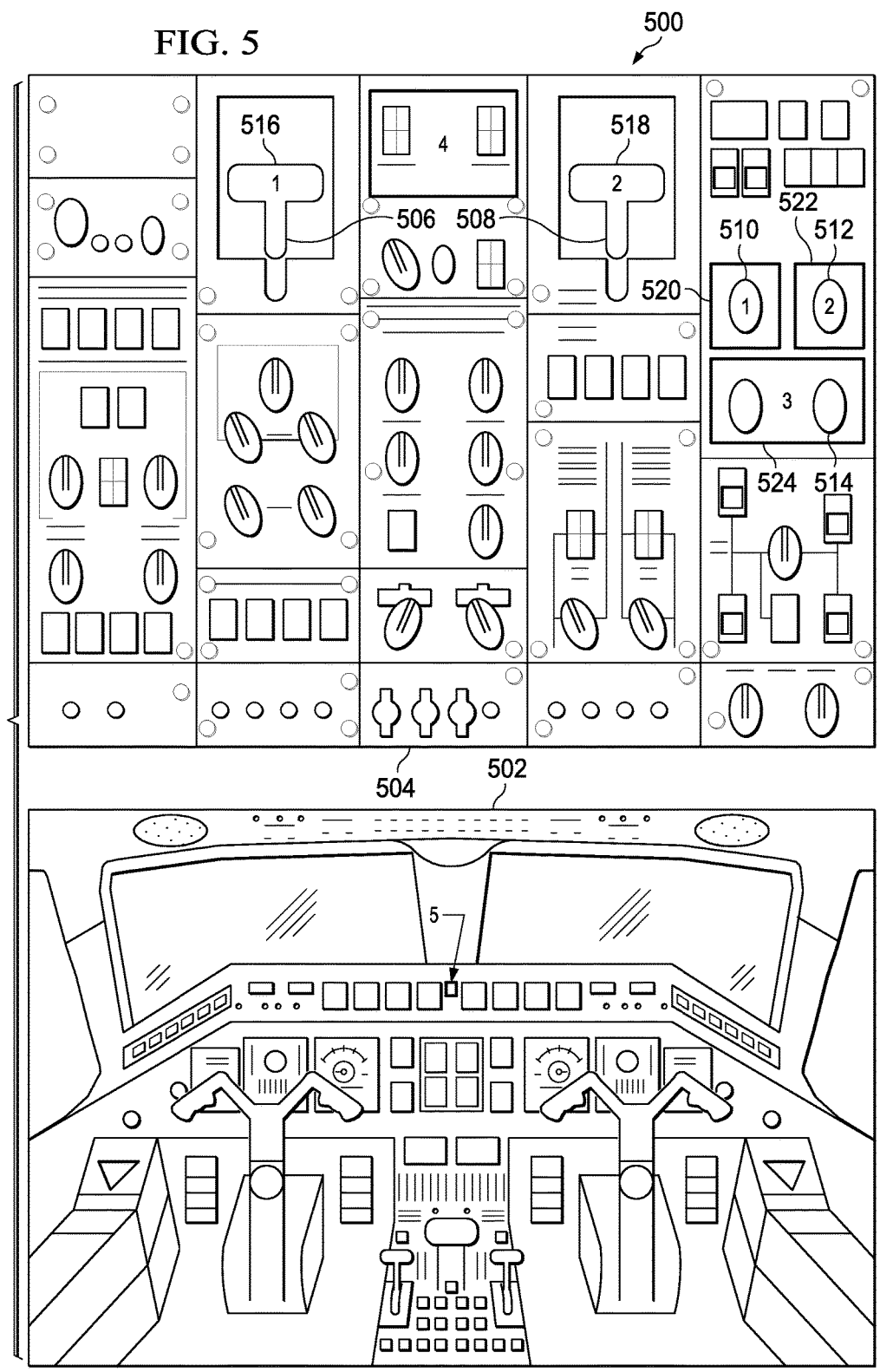
FIG. 5 is an illustration of a display in an aircraft simulation system in accordance with an illustrative embodiment.

Turning now to FIG. 5, an illustration of a display in an aircraft simulation system is depicted in accordance with an illustrative embodiment. In this illustrative example, display 500 is an example of a display that may be displayed by display system 122 in user interface 116 of aircraft simulation system 106 in FIG. 1.

In this illustrative example, cockpit 502 is displayed within display 500 to the operator. In this illustrative example, the display of cockpit 502 shows a briefing to the operator prior to beginning the simulation to perform one or more sequences of operations for one or more tasks.

As depicted, display 500 also includes overhead panel 504 in cockpit 502 shown in an enlarged or zoomed-in view. This view is provided as part of the briefing. In display 500, controls 506, 508, 510, 512, and 514 are highlighted through visual cues 516, 518, 520, 522, and 524, respectively. These visual cues take the form of color highlighting the controls or outlining the controls. The visual cues may take other forms depending on the particular implementation. For example, without limitation, the visual cues may be icons displayed near or on the controls, text, tooltips, animation, and other suitable types of visual cues that draw the attention of the operator to the controls.

Figure 6:
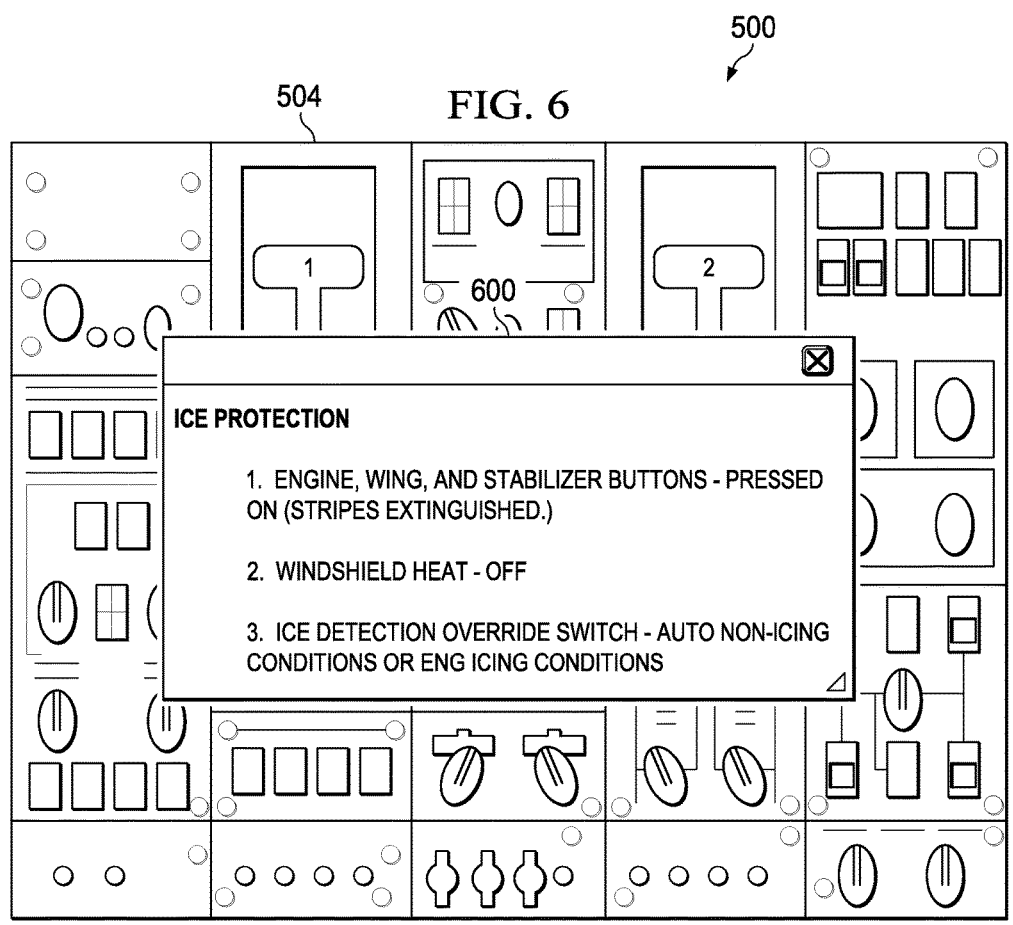
FIG. 6 is an illustration of a view presented during a simulation in accordance with an illustrative embodiment.

Turning now to FIG. 6, an illustration of a view presented during a simulation is depicted in accordance with an illustrative embodiment. A sequence of operations may be presented to the pilot. In presenting information in these illustrative examples, the information may be presented visually through a display system or audibly through an audio system.

In this illustrative example, the current field of view of the operator is overhead panel 504. Additionally, display 500 also includes a display of the sequence of operations to be performed for an ice protection in window 600. By displaying the sequence of operations in window 600, an operator may be guided to interact with the controls in performing the sequence of operations.

Figure 7:
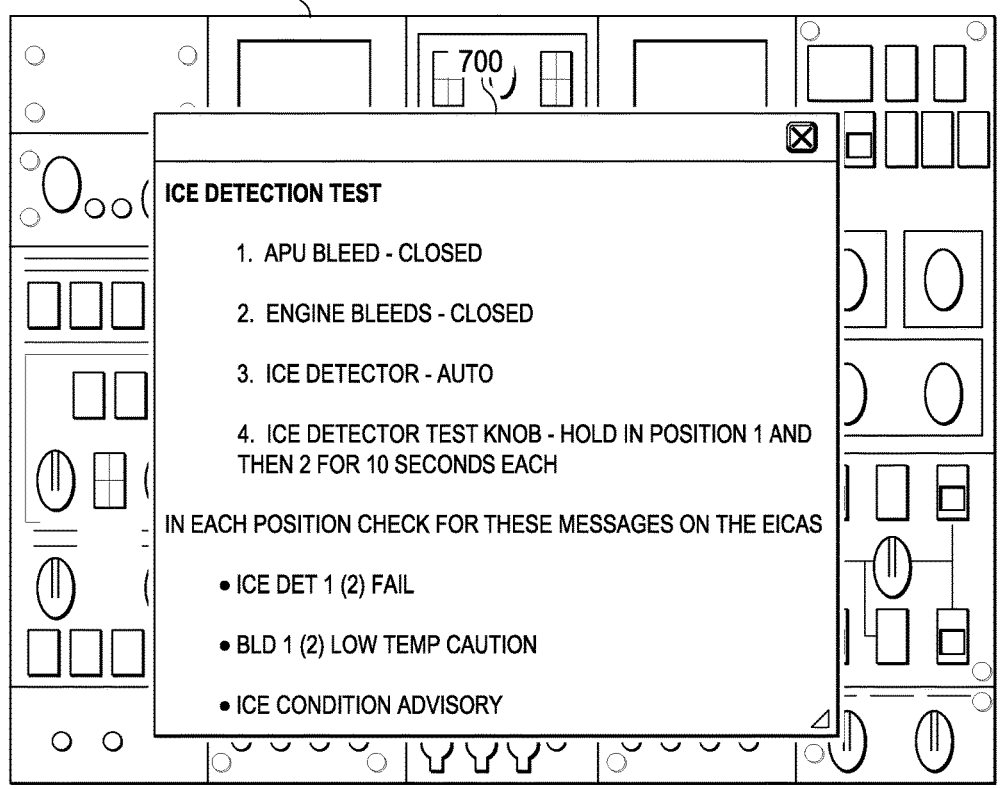
FIG. 7 is an illustration of information displayed during a simulation in accordance with an illustrative embodiment.

Turning now to FIG. 7, an illustration of information displayed during a simulation is depicted in accordance with an illustrative embodiment. In this example, as the operator interacts with the controls, information may be presented in window 700 to the operator. For example, without limitation, the information presented in window 700 may be information for a sequence of operations for an ice protection task.

Figure 8:
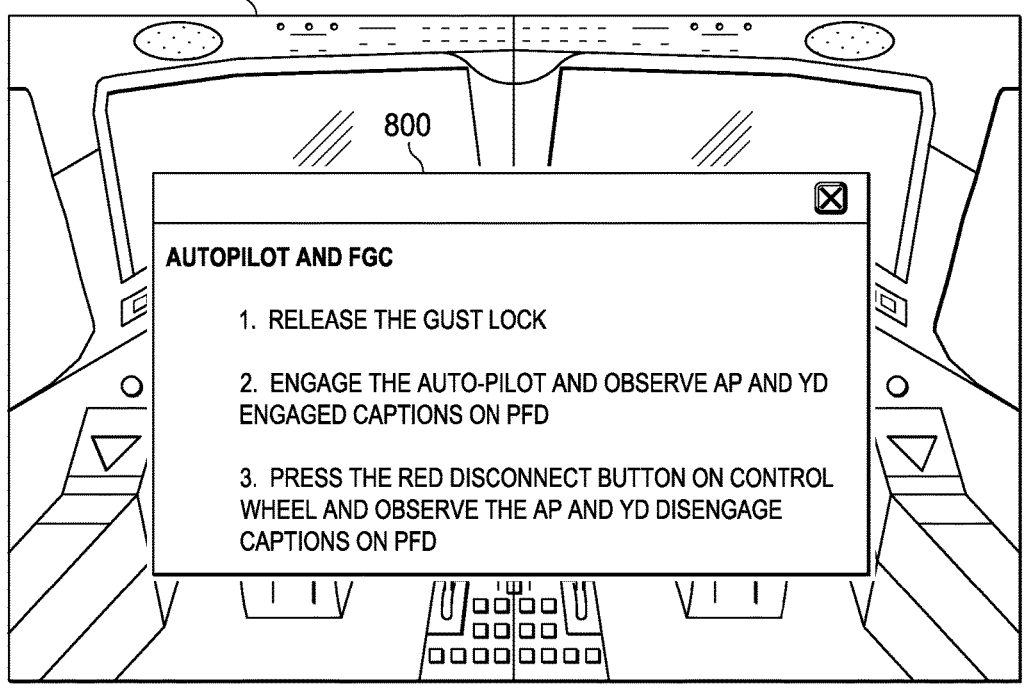
FIG. 8 is an illustration of a view displayed to an operator during a simulation in accordance with an illustrative embodiment.

Turning now to FIG. 8, an illustration of a view displayed to an operator during a simulation is depicted in accordance with an illustrative embodiment. In this illustrative example, cockpit 502 in display 500 is shown from a current field of view of the operator. In this example, window 800 displays a list of operations to be performed by the operator. For example, without limitation, the list of operations presented in window 800 may be a list of operations for autopilot navigation.

The illustrations of displays in FIGS. 5-8 are not meant to imply limitations to the manner in which different illustrative embodiments may be implemented. For example, although information is presented in displays to the operator, other illustrative embodiments may omit the use of windows during the performance of the operations. In this manner, a more realistic view of performing operations in the aircraft may be provided to the operator.

Figure 9:
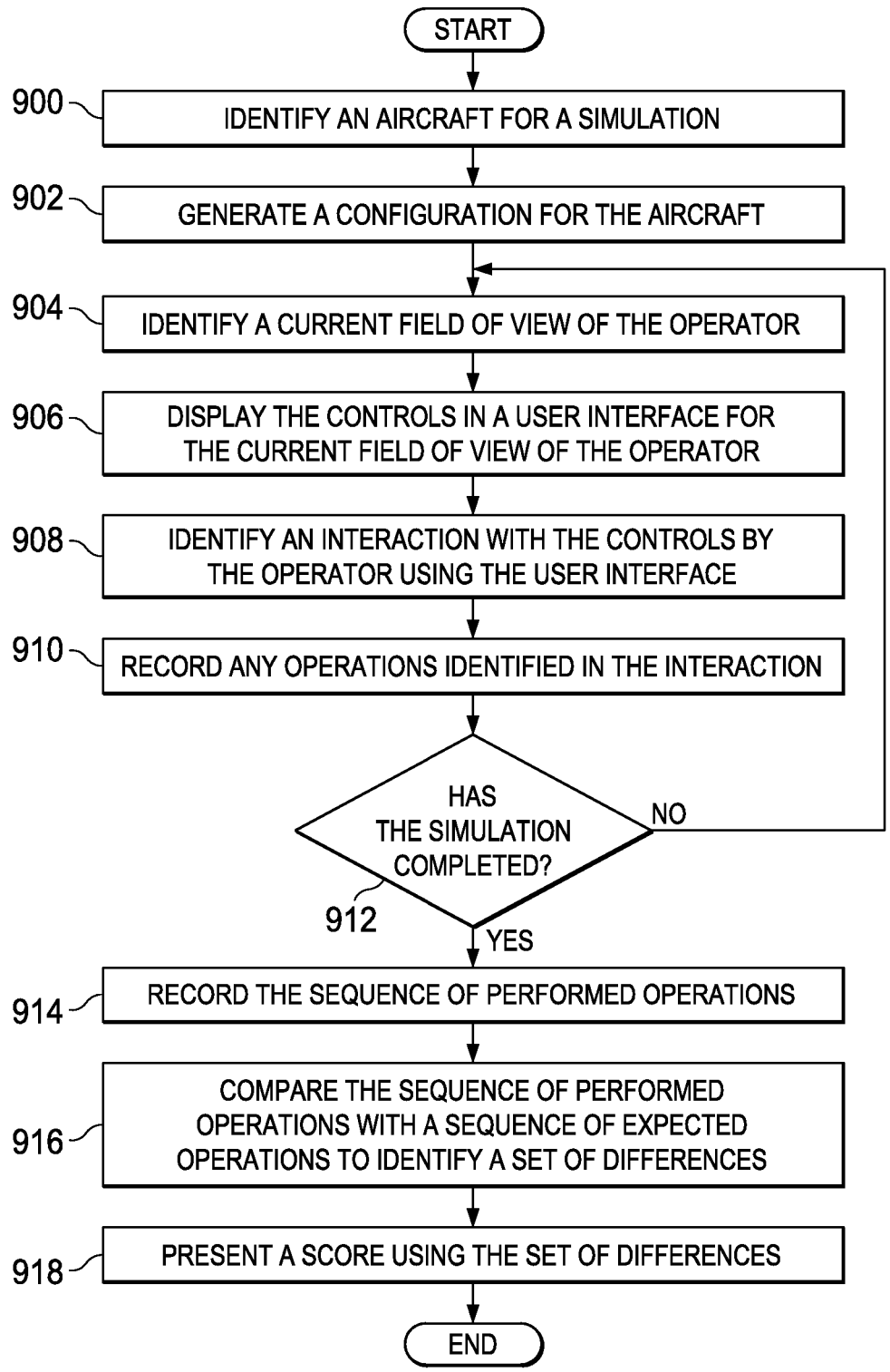
FIG. 9 is an illustration of a flowchart of a process for simulating interaction with controls in an aircraft in accordance with an illustrative embodiment.

With reference now to FIG. 9, an illustration of a flowchart of a process for simulating interaction with controls in an aircraft is depicted in accordance with an illustrative embodiment. The process illustrated in this flowchart may be implemented in aircraft task simulation environment 100 in FIG. 1. In particular, the different operations illustrated may be performed by simulator 118 within computer system 130.

The process begins by identifying an aircraft for a simulation (operation 900). The aircraft may be identified in a number of different ways. For example, the operator may select an aircraft, the aircraft may be received in a briefing package, or the aircraft may be selected in some other suitable manner.

A configuration is then generated for the aircraft (operation 902). This configuration includes generating the cockpit, controls, displays, and other components that can be seen in the cockpit or flight deck by an operator. The process then identifies a current field of view of the operator (operation 904).

Thereafter, the process displays the controls in a user interface for the current field of view of the operator (operation 906). Interaction with the controls by the operator is identified using the user interface (operation 908). The process then records any operations identified in the interaction (operation 910). A determination is made as to whether the simulation has completed (operation 912). If the simulation has not completed, the process returns to operation 904. Otherwise, if the simulation has completed, the sequence of performed operations is recorded (operation 914).

The process compares the sequence of performed operations with a sequence of expected operations to identify a set of differences (operation 916). A score may then be presented using the set of differences (operation 918) with the process terminating thereafter. This presentation may be made using a display system, an audio system, or a combination of the two.

Figure 10:
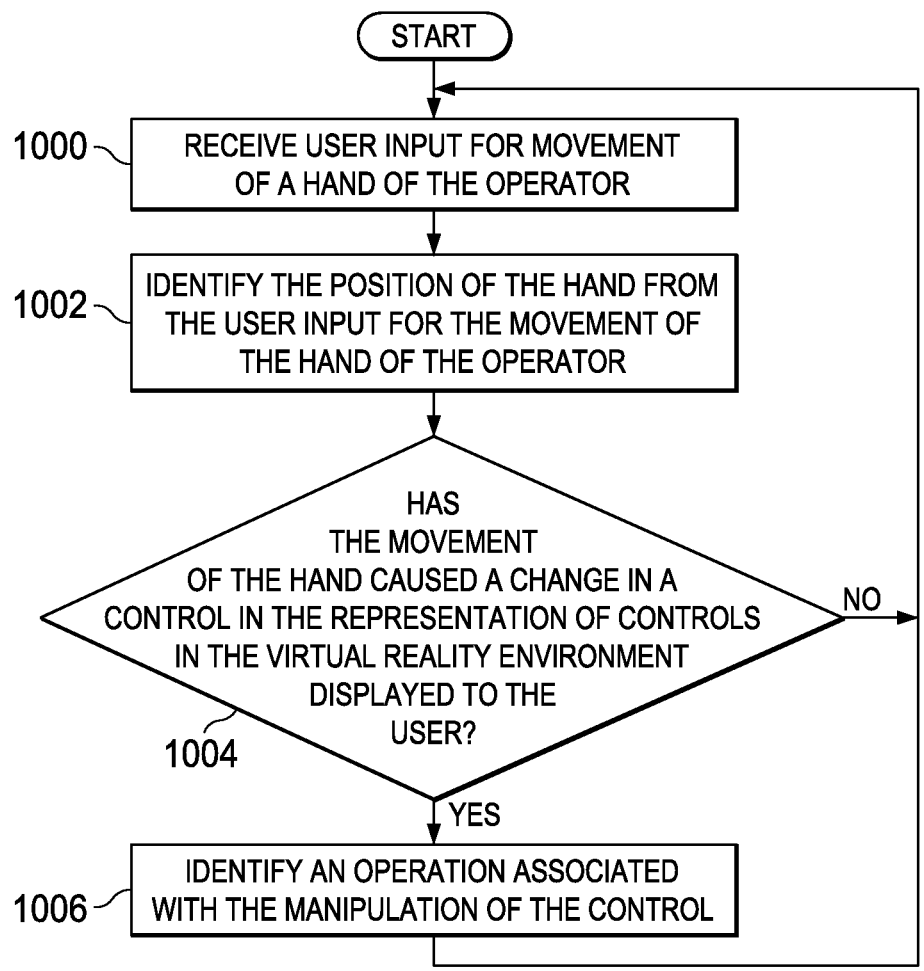
FIG. 10 is an illustration of a flowchart of a process for identifying operations performed by an operator from interactions with the controls in accordance with an illustrative embodiment.

Turning now to FIG. 10, an illustration of a flowchart of a process for identifying operations performed by an operator from interactions with the controls is depicted in accordance with an illustrative embodiment. The process illustrated in FIG. 10 is an example of one implementation for operation 908 in FIG. 9.

The process begins by receiving user input for movement of a hand of the operator (operation 1000). In these illustrative examples, the movement of the hand may also include movement of fingers on the hand of the operator. This user input may be received from various user input devices such as a motion data capture glove, a video camera, a touch screen, and other suitable input devices. When a motion data capture glove is used, the information provides a position of the hand and/or fingers of the operator.

In another illustrative example, the user input may be received from a video camera. The video camera may provide images with the position of the hand and/or fingers.

In yet another illustrative example, the user input device may be a touch screen. The movement of the hand may be identified based on where one or more fingers of the hand of the operator generate input on the touch screen.

The position of the hand is identified from the user input for the movement of the hand of the operator (operation 1002). Thereafter, a determination is made as to whether the movement of the hand causes a change in a control in the representation of controls in the virtual reality environment displayed to the user (operation 1004).

If the movement of the hand does not cause a change in a control, the process returns to operation 1000.

If the movement of the hand causes a change in the control, the process identifies an operation associated with the manipulation of the control (operation 1006). The operation may be identified based on the construction of the cockpit and controls by using information about the aircraft. For example, the movement of the hand may turn a switch on, rotate a knob, push a button, or perform some other manipulation of a control. This manipulation of a control may be used to identify the operation performed.

The process then returns to operation 1000.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, additional operations may be included to provide a briefing of the sequence of operations for which training or testing is to be performed. In still other illustrative examples, additional information may be displayed to the user in addition to the controls and components seen by the operator in the cockpit from the current field of view of the operator. For example, a list of the sequence of operations to be performed may be displayed in a window while the operator is interacting with the controls. In still other illustrative examples, information may be displayed as operators interact with different controls. For example, information about the result of the use of the control may be displayed in a window to the user.

Turning now to FIG. 11, an illustration of a data processing system is depicted in accordance with an illustrative embodiment. Data processing system 1100 may be used to implement computers and devices such as computer system 130 in FIG. 1, computer 306 in FIG. 3, tablet computer 408 in FIG. 4, and other suitable devices. In this illustrative example, data processing system 1100 includes communications framework 1102, which provides communications between processor unit 1104, memory 1106, persistent storage 1108, communications unit 1110, input/output (I/O) unit 1112, and display 1114. In these examples, communications framework 1102 may be a bus system.

Processor unit 1104 serves to execute instructions for software that may be loaded into memory 1106. Processor unit 1104 may be a number of processors, a multi-processor core, or some other type of processor, depending on the particular implementation. A "number of", as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. In these illustrative examples, the instructions are in a functional form on persistent storage 1108. These instructions may be loaded into memory 1106 for execution by processor unit 1104. The processes of the different embodiments may be performed by processor unit 1104 using computer implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108.

Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications framework 1102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1106, or a cache, such as found in an interface and memory controller hub that may be present in communications framework 1102.

The description of the different illustrative embodiments have been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing a time and a cost for performing a sequence in a full flight simulator, the method comprising, before entering the full flight simulator:

presenting virtual reality images, representing objects, on a flight deck that would be visible based on a position and an orientation of an operator relative to a display system, in a virtual reality of the full flight simulator, on a display system, such that as at least one of the display system and the position physically move, the virtual reality images presented on the display system change to recreate a new view of the flight deck that would be visible from a new position and orientation of the operator relative to the display system;

receiving, in a user input system comprising the display system, inputs interacting with objects;
connecting a processor to the display system and generating the new view for the virtual reality presented on the display system based upon:
  the display system comprising a first sensor sending a coordinate of the display system sent to the processor;
  a physical configuration of the full flight simulator represented in the virtual reality; and
  a second sensor sending coordinates, representing the position of the operator relative to the display system, to the processor, such that a presentation of a current field of view changes in response to changing at least one of: the coordinate of the display system, and the coordinates representing the position;
presenting, on the display system, images guiding interactions with the objects;
recognizing coordinates relative to the display system of an interaction with a presentation, of an object in the full flight simulator, in the current field of view for the virtual reality presented on the display system, via a third sensor, without requiring a physical representation, as presented in the full flight simulator, of the object;
changing the presentation of the object in response to the interaction; and
presenting a computation of a score, relative to briefing package that comprises a task and an identification of an aircraft simulated by the full flight simulator, for a sequence of interactions with the presentation of the object in the full flight simulator.

2. A machine that comprises:
i. a user interface system configured to receive inputs that interact with objects that exist in a virtual reality presented on a display system that comprises:
  ii. a connection to a processor unit configured to:
    iii. generate a current field of view images for the display system, wherein a field of view image recreates a view of a flight deck that would be visible based on a position and orientation of an operator relative to the display system, such that as at least one of the display system and the position physically move, images presented on the display system change to recreate a new view of the flight deck that would be visible from the new position and orientation, wherein a generation of the current field of view images is based upon:
      iv. a first sensor of the display system that sends a coordinate of the display system sent to the processor unit;
      iv. a physical configuration of the flight deck represented by the virtual reality presented; and
      iv. a second sensor that sends coordinates that represent an operator position and orientation to the processor unit, such that a presentation of the new view for the display system changes in response to at least one of a change in: the coordinate of the display system, and the coordinates that represent the operator position; and
    iii. present, on the display system, a guide to interactions with the objects;
  ii. a third sensor configured to recognize coordinates, relative to the display system, of an interaction with a presentation, in the view presented on the display system, of an object in the flight deck, without requiring a physical representation, as present in a full flight simulator, of the object, such that the presentation, in the view presented on the display system of the object in the flight deck, changes in response to the interaction;
  ii. a computation of a score, relative to a briefing package that comprises a task and an identification of an aircraft that comprises the flight deck, for a sequence of interactions with the presentation of the object in the flight deck.

3. The machine of claim 2, wherein the processor unit is configured to compare the sequence of interactions with an expected sequence of the task and identify a set of differences between the sequence of interactions and the expected sequence of the task.

4. The machine of claim 3, wherein the processor unit is configured to generate the score from the set of differences.

5. The machine of claim 2, wherein the processor unit is configured to present a sequence of expected operations prior to recording the sequence of interactions.

6. The machine of claim 2, wherein the second sensor comprises:
  a head motion sensor configured to identify movement of a head of the operator; and
  a hand motion sensor configured to identify motion of a hand of the operator.

7. The machine of claim 2, wherein the processor unit comprises:
  a learning processor configured to receive the briefing package and control a simulation generated by an aircraft simulation system;
  a cockpit synthesizer configured for use with an aircraft configurator by the learning processor to generate a virtual representation, in the view, of controls in the flight deck; and
  a flow configurator configured to detect a sequence of expected interactions with a user input system.

8. The machine of claim 2, wherein the display system and the processor unit are located in one of a tablet computer, and a mobile phone.

9. The machine of claim 2, wherein the display system and the processor unit are located in a computer system selected from one of a mobile computer, a tablet computer, and a mobile phone.

10. The machine of claim 2, further comprising the processor unit configured to compare a sequence of performed operations with a sequence of expected operations and identify a set of differences between the sequence of performed operations and the sequence of expected operations.

11. The machine of claim 10, the processor unit further configured to generate the score from the set of differences.

12. The machine of claim 2, wherein a user input system comprises the display system.

13. The machine of claim 12, wherein the display system is selected from one of stereoscopic glasses, a head worn display system, and a liquid crystal display monitor.

14. The machine of claim 12, wherein the user input system comprises at least one of a camera and a motion data capture glove.

15. The machine of claim 12, wherein the user input system further comprises an audio system.

16. A method for changing a position of an image of an object shown in a display system showing a field of view of a simulation of a flight deck, without requiring a physical representation, as present in a full flight simulator, of the object, the method comprising:

presenting virtual reality images representing objects, on a flight deck that would be visible based on a position and an orientation of an operator relative to a display system, in a virtual reality presented on the display system, such that as at least one of the display system and the position of the operator physically move, the virtual reality images presented on the display system change to recreate a new view of the flight deck that would be visible from a new position and orientation of the operator relative to the display system;

receiving, in the display system, inputs interacting with objects;

connecting a processor to the display system and:
   generating a current field of view for the display system based upon:
      a first sensor of the display system sending a coordinate of the display system sent to the processor;
      a physical configuration of the full flight simulator represented in the virtual reality; and
      a second sensor that sending coordinates that represent an operator position relative to the display system to the processor, such that a presentation of the current field of view for the display system changes in response to at least one of a change in: the coordinate of the display system, and the coordinates that represent the operator position; and
   presenting, on the display system, images guiding interactions with the objects;

recognizing coordinates, relative to the display system, of an interaction with a presentation of the object, in the flight deck, in the current field of view presented on the display system, via a third sensor, without requiring the physical representation, as present in the full flight simulator, of the object;

changing the presentation of the object in response to the interaction;

presenting a computation of a score, relative to a briefing package that comprises a task and an identification of an aircraft that comprises the flight deck, for a sequence of interactions with the presentation.

17. The method of claim 16, further comprising:
presenting a sequence of expected operations prior to recording the sequence of interactions with the presentation.

18. The method of claim 16, wherein recognizing coordinates of the interaction further comprises:
identifying motion of a hand of the operator with respect to flight deck controls represented in the display system.

19. The method of claim 16, further comprising:
comparing a sequence of performed operations with a sequence of expected operations and identifying a set of differences between the sequence of performed operations and the sequence of expected operations.

20. The method of claim 19, further comprising:
generating the score from the set of differences.

* * * * *